(12) United States Patent
Ludewigt

(10) Patent No.: US 6,600,763 B2
(45) Date of Patent: Jul. 29, 2003

(54) SOLID-STATE LASER COOLING

(75) Inventor: Klaus Ludewigt, Oststeinbeck (DE)

(73) Assignee: Rofin-Sinar Laser GmbH, Hamburg (DE)

(*) Notice: Subject to any disclaimer, the term of this patent is extended or adjusted under 35 U.S.C. 154(b) by 0 days.

(21) Appl. No.: 10/080,360

(22) Filed: Feb. 21, 2002

(65) Prior Publication Data
US 2002/0110162 A1 Aug. 15, 2002

Related U.S. Application Data

(63) Continuation of application No. PCT/EP00/08079, filed on Aug. 18, 2000.

(30) Foreign Application Priority Data

Aug. 21, 1999 (DE) .......................... 199 39 774

(51) Int. Cl.⁷ .............................. H01S 3/933
(52) U.S. Cl. ................. 372/35; 204/298.12; 372/75
(58) Field of Search ............................ 372/35

(56) References Cited

U.S. PATENT DOCUMENTS

| | | | | |
|---|---|---|---|---|
| 4,012,242 A | * | 3/1977 | Matare | 117/56 |
| 5,449,445 A | * | 9/1995 | Shinneman et al. | 204/298.09 |
| 5,546,416 A | * | 8/1996 | Basu | 372/34 |
| 5,548,605 A | * | 8/1996 | Benett et al. | 372/36 |
| 6,347,109 B1 | * | 2/2002 | Beach et al. | 372/75 |

FOREIGN PATENT DOCUMENTS

| | | |
|---|---|---|
| DE | 1 942 002 | 3/1970 |
| DE | 41 32 063 A1 | 4/1993 |
| DE | 42 39 653 A1 | 6/1994 |
| DE | 197 34 484 A1 | 9/1998 |
| JP | 04 302 186 A | 10/1992 |
| WO | WO 98/10497 | 3/1998 |

OTHER PUBLICATIONS

J.A. Abate et al.: "Active mirror: a large–aperture medium–repetition rate Nd:glass amplifier", Applied Optics, vol. 20, No. 2, Jan. 15, 1981, 351–361.

R. Weber et al.:„Cooling Schemes for Longitudinally Diode Laser–Pumped ND:YAG Rods, IEEE Journal of Quantum Electronics, vol. 34, No. 6, Jun. 1998, pp. 1046–1053.

* cited by examiner

*Primary Examiner*—Paul Ip
*Assistant Examiner*—Dung Nguyen
(74) *Attorney, Agent, or Firm*—Laurence A. Greenberg; Werner H. Stemer; Ralph E. Locher

(57) ABSTRACT

A solid-state laser includes a crystal wafer provided as an active medium, a cooling chamber for accommodating a cooling liquid, and an optically transparent support body. The crystal wafer has a flat side that faces the cooling chamber and a side that is remote from the cooling chamber. The flat side of the crystal wafer is in direct thermal contact with the cooling liquid. The cooling chamber has a wall element that is formed by the crystal wafer. The optically transparent support body is configured on the side of the crystal wafer that is remote from the cooling chamber. Since, the crystal wafer is in direct thermal contact with the cooling liquid, a minimal heat transfer resistance is ensured that even when the crystal wafer becomes deformed.

12 Claims, 1 Drawing Sheet

SOLID-STATE LASER COOLING

CROSS-REFERENCE TO RELATED APPLICATION

This application is a continuation of copending International Application No. PCT/EP00/08079, filed Aug. 18, 2000, which designated the United States.

BACKGROUND OF THE INVENTION

FIELD OF THE INVENTION

The invention relates to a solid-state laser with a crystal wafer as an active medium, which, for cooling purposes, is in direct thermal contact with a cooling liquid situated in a cooling chamber.

A solid-state laser of this type is known, for example, from U.S. Pat. No. 5,553,088. The laser-active basic element of a solid-state laser of this type, which is also referred to in the literature as a disk laser, is a thin crystal wafer that is only a few tenths of a millimeter to a few millimeters thick and typically has a diameter of the order of magnitude of approximately 10 mm. The wafer is arranged on a solid heat sink consisting of copper, and the surface of the wafer that faces the heat sink is provided with a reflective layer. A soft interlayer, for example, of indium In, which is able to absorb the thermal deformation of the crystal when the laser is operating, is inserted in order to connect the crystal wafer to the heat sink. The heat that is generated in the crystal wafer flows into the solid heat sink via the ductile interlayer. Cooling liquid, generally water, flows through the heat sink, with the result that the heat is dissipated.

However, the known structure has a range of drawbacks. Using a ductile interlayer between the heat sink and the crystal wafer increases the heat transfer resistance even with an ideal, large-area contact. The heat transfer resistance is also highly dependent on the quality of the contact between the crystal wafer and the heat sink, so that a high outlay on manufacturing technology is required in order to achieve sufficient reproducibility of the thermal contact. Furthermore, in operation, if the thermally produced deformation of the crystal wafer is excessive, it is impossible to prevent the cooling contact from at least partially breaking off, resulting in a considerable deterioration in the dissipation of heat in these zones.

It has been possible to avoid the abovementioned drawbacks if there is direct thermal contact between the cooling liquid and the crystal wafer, as is known, for example, in the cooling arrangement for a laser diode shown in German Patent Application DE 197 34 484 A1. In this known cooling arrangement, a laser diode is arranged on a heat sink that has a cooling channel for a cooling liquid. The laser diode is arranged above an opening of the cooling channel, so that it is in direct thermal contact with the cooling liquid. In this way, good cooling is ensured even in the event of any thermal deformation.

It is also known from IEEE Journal of Quantum Electronics, Vol. 34, No. 6, 1998, pp. 1046–1053, to cool the laser rods of a solid-state laser by directly contacting the laser rods with cooling water.

Direct cooling of this type, however, is not readily possible with the fragile, thin crystal wafer of a disk laser.

SUMMARY OF THE INVENTION

It is accordingly an object of the invention to provide a solid-state laser having a crystal wafer as an active medium which overcomes the above-mentioned disadvantages of the prior art apparatus of this general type.

In particular, it is an object of the invention to provide a solid-state laser having a crystal wafer as an active medium, in which the cooling is improved as compared to known disk lasers.

With the foregoing and other objects in view there is provided, in accordance with the invention, a solid-state laser that includes: a crystal wafer provided as an active medium; a cooling chamber for accommodating a cooling liquid; and an optically transparent support body. The crystal wafer has a flat side that faces the cooling chamber and a side that is remote from the cooling chamber. The flat side of the crystal wafer is in direct thermal contact with the cooling liquid. The cooling chamber has a wall element that is formed by the crystal wafer. The optically transparent support body is configured on the side of the crystal wafer that is remote from the cooling chamber.

Since, according to the invention, the crystal wafer forms a wall element of the cooling chamber that accommodates the cooling liquid, and therefore one of its flat sides is in direct thermal contact with the cooling liquid, a minimal heat transfer resistance is ensured. This minimal heat transfer resistance is not affected even by deformation of the crystal wafer, since the cooling liquid is always in contact with the crystal wafer irrespective of the shape of the latter, so that cooling cracking cannot occur. Moreover, it is easy, in terms of manufacturing technology, to make the low heat transfer resistance highly reproducible.

Cooling by direct thermal contact with the cooling liquid is possible since an optically transparent support body is arranged on the side of the crystal wafer that is remote from the cooling chamber. This measure avoids deformation of the crystal wafer, which is caused by a pressure difference formed between the cooling chamber and the outside space because of the pressure of the cooling liquid. Vibrations of the crystal wafer are also suppressed, and in particular in the case of cooling liquid flowing directly onto the crystal wafer, the wafer is prevented from breaking up in the event of an excessively high liquid pressure. Using a support body is advantageous, in particular, with wafers having a very low thickness, for example of less than 300 $\mu$m, such as those that are used in high-power lasers.

In accordance with another feature of the invention, the flat side of the crystal wafer that faces the cooling chamber and that is in direct thermal contact with the cooling liquid is preferably provided with a protective layer that is resistant to mechanical and chemical attacks from the cooling liquid. This ensures a long operating life of the crystal wafer.

In particular, the protective layer which forms the surface of the crystal wafer consists of metal, in particular gold (Au). Since a gold layer which is, for example, applied by vapor deposition, as a final layer, adheres very well to the reflective layer of the crystal wafer, a high mechanical stability and also a high chemical stability with respect to the cooling liquid are ensured.

Alternatively, the protective layer consists of a dielectric material, in particular silicon dioxide ($SiO_2$). This measure further increases the mechanical stability.

In accordance with an added feature of the invention, the support body is in disk form and has a flat side that is connected in a non-positive or force-locking manner to the crystal wafer. The large-area connection results in particularly uniform supporting of the crystal wafer.

In accordance with an additional feature of the invention, the crystal wafer is pressed onto the support body. A mechanical press joint of this type is particularly easy to achieve in terms of manufacturing technology and also allows the crystal wafer and the support body to be separated.

In accordance with another feature of the invention, the support body is unreleasably connected to the crystal wafer. This measure allows particularly good contact between the support body and the crystal wafer to be ensured.

In accordance with a further feature of the invention, the support body consists of undoped YAG or of sapphire, which is preferably joined to the crystal wafer by a diffusion bonding process, thus allowing a particularly stable joint between the crystal wafer and the support body.

In accordance with a concomitant feature of the invention, the end face of the support body that is remote from the crystal wafer is curved. As a result, the support body can simultaneously be used for beam shaping.

Other features which are considered as characteristic for the invention are set forth in the appended claims.

Although the invention is illustrated and described herein as embodied in a solid-state laser cooling, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
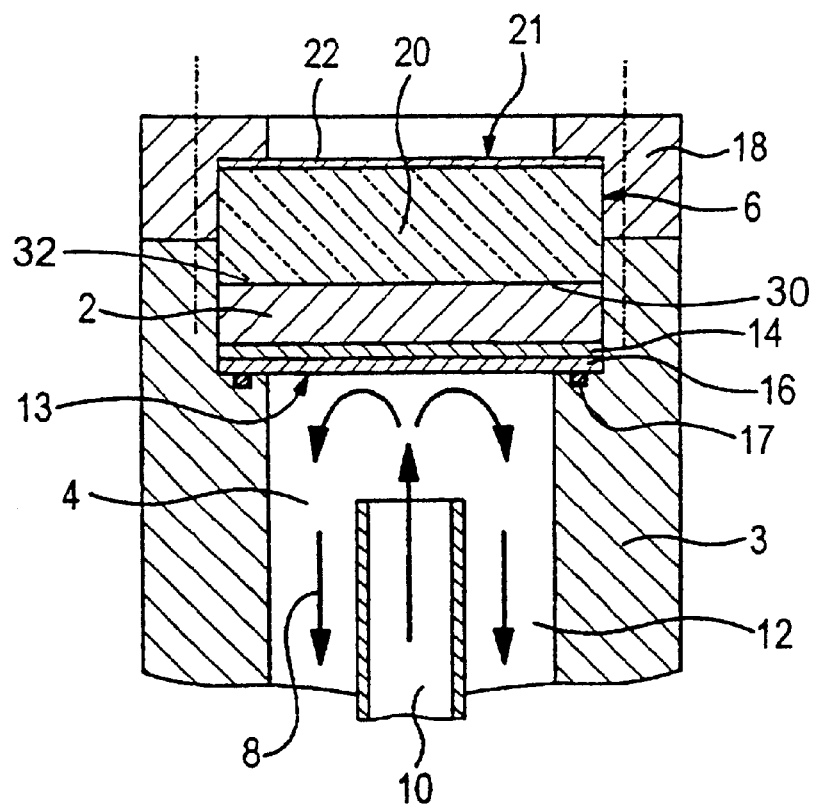
FIG. 1 is a diagrammatic cross sectional view of a solid-state laser having a directly cooled crystal wafer.

Referring now to the figures of the drawing in detail and first, particularly, to FIG. 1 thereof, there is shown a crystal wafer 2 that is used as the laser-active medium. The crystal wafer 2 is inserted into the wall 3 of a cooling chamber 4 and forms a wall element delimiting the cooling chamber 4. The cooling chamber 4 is in the form of a hollow cylinder in the exemplary embodiment and has a groove 6 on the inner circumference, in which the crystal wafer 2 is inserted.

In the cooling chamber 4, there is a cooling liquid 8, which in the example, is guided by an internal cooling channel 10 and flows directly onto the crystal wafer 2. The cooling liquid 8 is diverted by the crystal wafer 2 and is discharged in an annular channel 12.

The crystal wafer 2 has a flat side 13 that faces the cooling chamber 4. The flat side 13 of the crystal wafer 2 is provided with a highly reflective, generally multilayer reflective layer 14, to which a protective layer 16, for example gold (Au) or silicon dioxide ($SiO_2$), is applied. It is additionally possible for the optical properties of the protective layer 16 to improve the reflective properties of the reflective layer 14. In other words, the protective layer 16 may also be the final layer, which forms the surface, of the multilayer reflective layer 14.

First, the mechanical stability of the protective layer 16 is sufficient to ensure that the protective layer 16 cannot be detached by the cooling liquid 8, generally water, flowing on to it. Second, the protective layer 16 protects the reflective layer 14 beneath it from chemical attack by the cooling liquid 8.

To achieve a sufficient seal of the cooling chamber 4 with respect to the outside, it is additionally possible to provide a sealing device 17, for example, an elastic sealing ring, which additionally leads to a press fit of the crystal wafer in the grooves 6. For achieving the press fit, in the example, there is an annular flange 18 that is clamped against the end face of the wall 3. The end face and the wall each have recesses which, in the assembled state, form the groove 6.

An optically transparent support body 20 is arranged on the flat side 30 of the crystal wafer 2 that is remote from the cooling chamber 4. The optically transparent support body 20 preferably has a flat side 32 that is connected in a non-positive or force-locking manner to the flat side 30 of the crystal wafer 2, as will be subsequently described. The optically transparent support body 20 has an end face 21 that is remote from the cooling chamber 4 and this end face 21 is provided with an antireflective, highly transparent layer 22.

In the exemplary embodiment, the crystal wafer 2 is longitudinally pumped, i.e. the pumping light is introduced on the flat side of the crystal wafer 2 from which the laser beam emerges. Alternatively, the crystal wafer 2 may also be radially pumped. In this case, radial passage openings, through which the pumping light can laterally enter the crystal wafer 2, are provided in the region of the groove 6. The pumping light may also be introduced laterally and obliquely into the support body 20, and from there, diverted into the crystal wafer 2 by internal reflection.

The support body 20, like the crystal wafer 2, is in disk form, so that there is a large-area connection between the crystal wafer 2 and the support body 20. This can be brought about by a press fit between the crystal wafer 2 and the support body 20, for example, by clamping them into the groove 6 using the annular flange 18. It is preferable, however, to use an unreleasable bonded joint, in which case in particular joining using a diffusion bonding process is advantageous. In the diffusion bonding process, the parts that are to be joined are polished very well, are pressed onto one another and are then brought to a temperature that is just below the melting point. Then, ion exchange through the boundary surface commences (diffusion), so that a secure joint of high optical quality is formed. This process is carried out, for example, by the company ONYX OPTICS, 6551 Sierra Lane, Dublin, Calif. 94568.

Providing the support body 20 with a thickness that is in the millimeter range is sufficient to bring about sufficient mechanical stability. Sapphire or undoped YAG are particularly suitable materials because, as well as having excellent optical properties, their coefficients of expansion differ only slightly from the coefficient of expansion of the crystal wafer 2, which is advantageous.

If the crystal wafer 2 is only pressed mechanically onto the support body 20, it is additionally possible to introduce a reflection-reducing boundary layer between crystal wafer 2 and support body 20. This is dispensed with if crystal wafer 2 and support body 20 are joined directly to one another by a diffusion bonding process.

Figure 2:
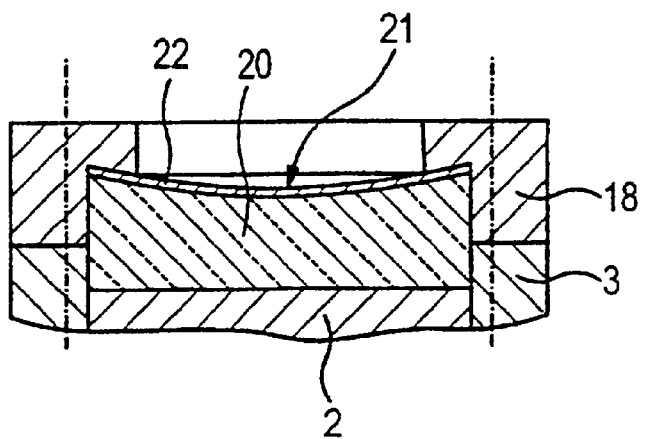
FIG. 2 is a diagrammatic cross sectional view of another embodiment of a solid-state laser.

As an alternative to the embodiment of the support body 20 with a planar end face 21 as illustrated in FIG. 1, FIG. 2 shows an embodiment in which the end face 21 is curved concavely, however, the end face 21 can be curved convexly.

In this case, the support body 20 simultaneously serves as an imaging optical element and also serves for geometrically shaping (beam shaping) the laser beam. This form is possible since the support body 20 has a thickness that allows the surface to be shaped by grinding. In principle, the application of an optical element of this type to the crystal wafer 2 is also advantageous in disk lasers in which the crystal wafer 2 is cooled conventionally, i.e. is not in direct contact with the cooling liquid, as in the present invention.

I claim:

1. A solid-state laser, comprising:

a cooling chanter for accommodating a cooling liquid;

a laser-active crystal wafer, said crystal water forming a wall element delimiting said cooling chamber, said crystal wafer having a first flat side facing toward said cooling chamber and a second flat side facing away from said cooling chamber, said first flat side being in direct thermal contact with said cooling liquid and a laser beam emerging from said second flat side; and a support body disposed on said second flat side, said support body being optically transparent for the laser beam.

2. The solid-state laser according to claim 1, further comprising:

a protective layer resistant to mechanical and chemical attacks from said cooling liquid;

said protective layer being applied on said first flat side of said crystal wafer.

3. The solid-state laser according to claim 2, wherein:

said support body is in a disk shape; and said support body has a flat Bide that is connected in a force-locking manner to said crystal wafer.

4. The solid-state laser according to claim 1, wherein:

said support body is in a disk shape; and said support body has a flat side that is connected in a force-locking manner to said crystal wafer.

5. The solid-state laser according to claim 4, wherein said crystal wafer is pressed onto said support body.

6. The solid-state laser according to claim 4, wherein said support body is unreleasably connected to said crystal wafer.

7. The solid-state laser according to claim 1, wherein said support body consists of undoped YAG.

8. The solid-state laser according to claim 1, wherein said support body consists of sapphire.

9. The solid-state laser according to claim 8, wherein said support body is diffusion bonded to said crystal wafer.

10. The solid-state laser according to claim 1, wherein said protective layer consists of gold.

11. The solid-state laser according to claim 1, wherein said protective layer consists of silicon dioxide.

12. The solid-state laser according to claim 1, wherein said support body has an end face that is remote from said crystal wafer, and said end face of said support body is curved.

* * * * *